(12) United States Patent
Ridha

(10) Patent No.: US 6,866,734 B1
(45) Date of Patent: Mar. 15, 2005

(54) TIRE DESIGN BASED ON FIRST PRINCIPLES OF STRUCTURAL ENGINEERING

(75) Inventor: Raouf Abdul Ridha, Sharon Center, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 0 days.

(21) Appl. No.: 10/149,328

(22) PCT Filed: Dec. 14, 1999

(86) PCT No.: PCT/US99/29526

§ 371 (c)(1),
(2), (4) Date: Jun. 5, 2002

(87) PCT Pub. No.: WO01/43992

PCT Pub. Date: Jun. 21, 2001

(51) Int. Cl.$^7$ ............................ B60C 13/00; B60C 9/18; B60C 15/06

(52) U.S. Cl. .................. 156/110.1; 156/130.7; 152/525; 152/526; 152/537; 152/539; 152/541; 152/547; 152/555

(58) Field of Search ................ 152/525, 526, 152/532, 538, 555; 156/123, 124, 130.7

(56) References Cited

U.S. PATENT DOCUMENTS

| | | | | |
|---|---|---|---|---|
| 3,976,115 A | * | 8/1976 | Mirtain et al. | 152/532 |
| 4,124,679 A | | 11/1978 | DeWitt | 264/326 |
| 4,147,751 A | | 4/1979 | Duderstadt et al. | 264/326 |
| RE30,549 E | | 3/1981 | Mirtain et al. | 152/361 R |
| 4,381,810 A | * | 5/1983 | Cady et al. | 152/209.5 |
| 4,513,802 A | | 4/1985 | Togashi et al. | 152/353 R |
| 4,762,158 A | | 8/1988 | Furuya et al. | 152/454 |
| 4,815,511 A | | 3/1989 | Brayer et al. | 152/209 |
| 5,526,863 A | * | 6/1996 | Hodges | 152/541 |
| 5,746,860 A | | 5/1998 | Moriyama | 156/111 |
| 5,785,781 A | | 7/1998 | Drieux et al. | 152/454 |
| 6,470,938 B1 | * | 10/2002 | Yokota et al. | 152/526 |

FOREIGN PATENT DOCUMENTS

| | | | |
|---|---|---|---|
| FR | 1059542 | | 3/1954 |
| JP | 53-136203 | * | 11/1978 |
| JP | 55-8903 | * | 1/1980 |
| JP | 59-67107 | * | 4/1984 |
| JP | 6-115309 | * | 4/1994 |
| JP | 11-165503 | * | 6/1999 |

OTHER PUBLICATIONS

Patent Abstracts of Japan vol 010. No 151 (M–483), May 31, 1986 & JP 61 006004 A (Bridgeatone KK), Jan. 11, 1986 abstract.

* cited by examiner

*Primary Examiner*—Blaine Copenheaver
*Assistant Examiner*—Justin Fischer
(74) *Attorney, Agent, or Firm*—Richard B. O'Planick; David L. King

(57) ABSTRACT

A new method for designing a tire comprises the steps of laying up a tire having a stiff lower sidewall portion (18*b*) that has a high modulus apex (17) and a high turn-up (16*a*) and a concave shape, a flexible upper sidewall portion (18*a*) that is decoupled from the tread (22). The tread (22) is supported by a wedge (21) and extended belts (20) to substantially eliminate lateral curvature. The tire of the invention also has a rho$_m$ that comprises 60% of the section height (SH) of the tire and a shoulder radius that defines a convex shape in upper sidewall portion (18*a*).

11 Claims, 7 Drawing Sheets

TIRE DESIGN BASED ON FIRST PRINCIPLES OF STRUCTURAL ENGINEERING

TECHNICAL FIELD

The invention relates to a method for designing a tire construction and a tire made using the method.

BACKGROUND ART

In prior art bias ply tires, the opposed angles of the reinforcement cords in adjacent carcass plies in the tire caused the carcass plies to work against each other, and this construction caused the bias ply tire to act as a unit. That is, stresses encountered by the tire while rolling on a vehicle were distributed throughout the tire. The breaker package in the tire provided a constant to stiffen the tire and reduce its deformation, and provided a base for a flattened tread against the road.

With the advent of the radial ply tire, the high angles of the reinforcement cords in the carcass plies, relative to the equatorial plane (EP) of the tire, reduced the interaction between the carcass plies and increased the flexibility of the sidewalls. The increased flexibility in the sidewalls reduced stresses on the crown and tread area of the tire since most of the energy absorbed by the tire while running on a vehicle was absorbed by the sidewalls.

Moriyama in U.S. Pat. No. 5,746,860, teaches a low-section profile pneumatic radial tire which is manufactured by using a green tire built in a first and a second building steps, wherein an uncured inner sidewall rubber segment and an uncured outer sidewall rubber segment are separately provided to correspond to an inner portion and an outer portion, and parted from each sidewall rubber of a tire, after vulcanization. The components are provided in a radial direction in the tire, providing a parting face located on an outer surface of the sidewall rubber which is not more than one half of a section height of the tire. The uncured inner sidewall rubber segment is attached in the first building step, and the uncured outer sidewall rubber segment is attached at the second building step. This construction is said to provide a tire which has excellent resistance to cracking in the sidewall portion without degrading tire performance.

Morel, in International Publication WO 99/42307, teaches a tire with a body ply reinforcement (1), a top ply reinforcement (3), and a tire tread (4) joined to two tire beads via two sidewalls (5). The axially outer edges of the tire tread are folded down over the radially outer ends of the sidewalks. A secular joint (J) between the tread and the sidewall is positioned such that its radius (R C) on the tire (P) axially outer wall ranges between 0.9 RS plus 0.1 RB and 0.8 RS plus 0.2 RB, and between RSS and 0.9 RSS plus 0.1 RB, where RS is the tire tread equatorial radius and RSS is the body ply mean line equatorial radius, and RB is the tire bead seat.

Continental Tire has published advertising that describes a "flat belt concept". A tire made using the "flat belt concept" is said to have a flatter contour which increases the contact area on the road's surface, and reduces the flexing of the tire. This is said to result in slow and even wear.

Scarlett, in Tire Technology International, September, 1998, pp. 15–17, and Drieux et al., in U.S. Pat. No. 5,785,781 teach a tire with an axially outer bead tip that is said to divorce the bead from the sidewall of the tire, the bead acting as a fulcrum to convert outward tension for tire retention.

U.S. Pat. No. 4,124,679 to DeWitt teaches a method of building a tire with unequal bead diameters where the two sidewalls of the tire have different profiles in the mold.

U.S. Pat. No. 4,147,751 to Duderstadt et al., teaches a method of making a pneumatic tire wherein the tire is cured in a mold with a curved configuration having the same tread radius in the center, and an increased tread radius at the margins of the tread.

U.S. Pat. No. 4,815,511 teaches a tire made using multiple radii in the mold shape.

It is an object of the invention to provide a new concept in tire design, which will improve the overall wear, handling, rolling resistance and traction properties of a tire.

Other objects of the invention will be apparent from the following description and claims.

SUMMARY OF THE INVENTION

A tire (10) comprises a pair of substantially annular beads (12), at least one carcass ply (16) wrapped around said beads, tread (22) disposed over said carcass ply in a crown area of the tire, and sidewalls (18) disposed between the tread (22) and the beads (12). The tire (10) is characterized in that a lower sidewall region (18b) of the tire is integrally connected with a bead area (12a) of the tire, and is stiffened such that the beads (12) and lower sidewalls (18b) pivot substantially in unison with respect to a rim (14) on which the tire may be mounted. The lower sidewall (18b) is connected to a mid-sidewall (18c) having less stiffness than the lower sidewall, and an upper sidewall (18a), having a geometry and a low flexural stiffness such that it acts like a flexible coil, is connected to the mid-sidewall (18c), and provides a non-coupling bridge between the tread (22) at the crown of the tire and the mid-sidewall (18c).

As a result of this construction, the tread (22) is flat with respect to a surface on which the tire (10) is in contact.

The tire may further comprise reinforcement belts or breakers (20) interposed between the carcass (16) and the tread (22) in a crown area of the tire (10). The belts (20) are cha act in that they are anchored in a shoulder region of the tire, thereby providing hinged support for the tread, and a decoupling of the tread (22) from the upper sidewall (18a), wherein the shoulder is defined as the intersection of the ply line radius and the tread radius.

Also, the $rho_m$ of the tire (10) is higher on the tire than 50% of the section height (SH) of the tire, and in the illustrated embodiment $rho_m$ is 55% to 65% of the section height (SH) of the tire.

The shape of the tire is defined such that the shoulder (26), 50% of the section height (32) and the bead (12) define points on a reference circle (30), and the shoulder radius $R_s$ of the tire is smaller than the radius $R_r$ of circle (30). In the illustrated embodiment, the shoulder radius $R_s$ of the tire is 50% to 60% of the radius $R_r$, of reference circle (30).

Also, the lower sidewalls (18b) have a concave profile, and the molded base width of the tire is 20% to 25% wider than the specification rim width for the tire.

In the illustrated embodiment, the turn-up ply endings extend at least to 30% of the section height of the tire, and the apex (17) extends at least 20% of the section height of the tire.

In a method of the invention, for constructing a pneumatic tire, the method comprises the steps of (a) building a tread (22) independently of the rest of the tire (10) wherein the tread is made to be linear across its width, (b) wrapping at least one carcass ply (16) around at least a pair of parallel annular beads (12) wherein a turnup (16a) of at least one carcass ply (16) extends at least 30%, but not more than 65% of the section height of the tire, (c) preparing a belt reinforcement (20) having substantial lateral stiffness, (d) applying the belt reinforcement (20) to a crown area of the carcass ply (16), (e) disposing a wedge (21) between the edges of the belt reinforcement (20) and the curvature of the carcass (16) in a shoulder area (26) of the tire, wherein a portion of the wedge (21) contiguous with belts (20) has a length comprising 37% to 43% of the tread width and a height sufficient to maintain the lateral linearity of the tread.

In the illustrated embodiment, the method further comprises the steps of preparing the belt reinforcement to have a lateral stiffness substantially equivalent to a belt reinforcement having two steel belts wherein each belt has 7.9 to 9.4 e.p.c. (20 to 24 e.p.i.) steel cord reinforcement having a diameter of 0.042 cm at an angle of 21°, and preparing an apex (17) for the tire having a length of 25% to 45% of the section height of the tire and a modulus of 4760 to 6160 Npscm (7000 to 9500 psi), and applying the apex (17) next to the bead (12) while constructing the tire (10).

In the illustrated embodiment, the method further comprises the steps of preparing the wedge (21) as an integral part of sidewall 18, wherein a portion of wedge 21 contiguous with belts (20) has a length of 37% to 43% of the tread width, and preparing wedge (21) to have a modulus of 396 to 594 Npscm (600 to 900 psi).

In the preferred embodiment, the method further comprises the step of curing a green tire to have a mold shape wherein the distance between the beads (12) in a curing mold is 110% to 175% times the distance between the bead seats on the specified design rim (14) for the tire. Definitions "Apex" refers to a wedge of rubber placed between the carcass and the carcass turnup in the bead area of the tire, usually used to stiffen the lower sidewall of the tire.

"Axial" and "axially" means lines or directions that are parallel to the axis of rotation of the tire.

"Bead" means that part of the tire comprising an annular tensile member wrapped by ply cords and shaped, with or without other reinforcement elements such as flippers, chippers, apexes, toe guards and chafers, to fit the design rim.

"Belt reinforcing structure" means at least two layers of plies of parallel cords, woven or unwoven, underlying the tread, unanchored to the bead, and having both left and right cord angles in the range from 17 degrees to 27 degrees with respect to the equatorial plane of the tire.

"Bias ply tire" means a tire having a carcass with reinforcing cords in the carcass ply extending diagonally across the tire from bead core to bead core at about a 25 to 50 degree angle with respect to the equatorial plane of the tire. Cords run at opposite angles in alternate layers.

"Breakers" refers to at least two annular layers or plies of parallel reinforcement cords having the same angle with reference to the equatorial plane of the tire as the parallel reinforcing cords in carcass plies.

"Carcass ply" means the tire structure apart from the belt structure, tread, undertread, sidewall rubber and the beads.

"Chafers" refers to narrow strips of material placed around the outside of the bead to protect cord plies from the rim, distribute flexing above the rim, and to seal the tire.

"Cord" means one of the reinforcement strands of which the plies in the tire are comprised.

"Design rim" means a rim having a specified configuration and width. For the purposes of this specification, the design rim and design rim width are as specified by the industry standards in effect in the location in which the tire is made. For example, in the United States, the design rims are as specified by the Tire and Rim Association. In Europe, the rims are as specified in the European Tyre and Rim Technical Organization—Standards Manual and the term design rim means the same as the standard measurement rims. In Japan, the standard organization is The Japan Automobile Tire Manufacturer's Association.

"Design rim width" is the specific commercially available rim width assigned to each tire size and typically is between 75 and 90% of the specific tire's section width.

"Equatorial plane (EP)" means the plane perpendicular to the tire's axis of rotation and passing through the center of its tread.

"Filament" refers to a single yarn.

"Footprint" means the contact patch or area of contact of the tire tread with a flat surface at zero speed and under normal load and pressure.

"Innerliner" means the layer or layers of elastomer or other material that form the inside surface of a tubeless tire and that contain the inflating fluid within the tire.

"Lateral edge" means the axially outermost edge of the tread as defined by a plane parallel to the equatorial plane and intersecting the outer ends of the axially outermost traction lugs at the radial height of the inner tread surface.

"Leading" refers to a portion or part of the tread that contacts the ground first, with respect to a series of such parts or portions, during rotation of the tire in the direction of travel.

"Molded base width" refers to the distance between the beads of the tire in the curing mold. The cured tire, after removal from the curing mold will substantially retain its molded shape, and "molded base width" may also refer to the distance between the beads in an unmounted, cured tire.

"Net contact area" means the total area of ground contacting tread elements between the lateral edges.

"Nominal rim diameter" means the average diameter of the rim flange at the location where the bead portion of the tire seats.

"Normal inflation pressure" refers to the specific design inflation pressure and load assigned by the appropriate standards organization for the service condition for the tire.

"Normal load" refers to the specific design inflation pressure and load assigned by the appropriate standards organization for the service condition for the tire.

"Pantographing" refers to the shifting of the angles of cord reinforcement in a tire when the diameter of the tire changes, e.g. during the expansion of the tire in the mold.

"Ply" means a continuous layer of rubber-coated parallel cords.

"Pneumatic tire" means a mechanical device of generally toroidal shape (usually an open torus) having beads and a tread and made of rubber, chemicals, fabric and steel or other materials. When mounted on the wheel of a motor vehicle, the tire through its tread provides a traction and contains the fluid or gaseous matter, usually air, that sustains the vehicle load.

"Radial" and "radially" means directions radially toward or away from the axis of rotation of the tire.

"Radial-ply tire" means a belted or circumferentially restricted pneumatic tire in which the ply cords which extend from bead to bead are laid at cord angles between 65 to 90 degrees with respect to the equatorial plane of the tire.

"Rho$_m$" refers to the perpendicular distance from the axis of rotation of a tire to a line parallel to the axis of rotation which passes through the maximum section width of the tire, as described by Purdy, "Mathematics Underlying the Design of Pneumatic Tires.", Hiney Printing Co., Akron, Ohio (1963).

"Section height" (SH) means the radial distance from the nominal rim diameter to the outer diameter of the tire at its equatorial plane.

"Section width" (SW) means the maximum linear distance parallel to the axis of the tire and between the exterior of its sidewalls when and after it has been inflated at normal pressure for 24 hours, but unloaded, excluding elevations of the sidewalls due to labeling, decoration or protective bands.

"Shoulder" means the upper portion of a sidewall just below the tread edge.

"Sidewall" means that portion of a tire between the tread and the bead.

"Splice" refers to the connection of end of two components, or the two ends of the same component in a tire. "Splice" may refer to the abutment or the overlapping of two such ends.

"Strain energy density" refers to the summation of the product of the six stress components (three normal stresses and three shear stresses) and their corresponding strains.

"Tire design load" is the base or reference load assigned to a tire at a specific inflation pressure and service condition: other load-pressure relationships applicable to the tire are based upon that base or reference.

"Tread" means a molded rubber component which, when bonded to a tire casing, includes that portion of the tire which comes into contact with the road when the tire is normally inflated and under normal load.

"Tread arc width" (TAW) means the width of an arc having its center located on the plane (EP) and which substantially coincides with the radially outermost surfaces of the various traction elements (lugs, blocks, buttons, ribs, etc.) across the lateral or axial width of the tread portions of a tire when the tire is mounted upon its designated rim and inflated to its specified inflation pressure but not subjected to any load.

"Tread width" means the arc length of the tread surface in the axial direction, that is, in a plane passing through the axis of rotation of the tire.

"Unit tread pressure" means the radial load borne per unit area (square centimeter or square inch) of the tread surface when that area is in the footprint of the normally inflated and normally loaded tire.

"Wedge" refers to a tapered rubber insert, usually used to define individual curvature of a reinforcing component, e.g. at a belt edge.

DETAILED DESCRIPTION OF THE INVENTION

Figure 1:
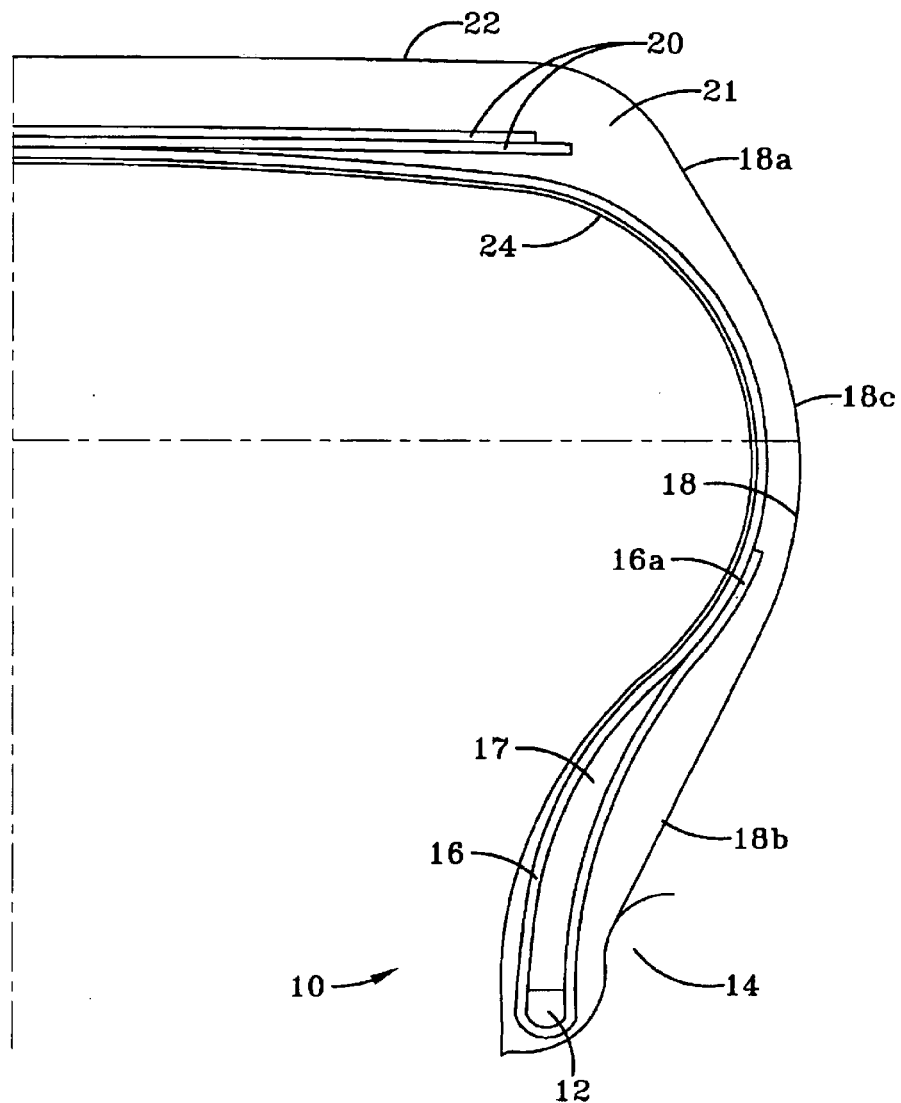
FIG. 1 illustrates the tire made using the method of the invention.

With reference now to FIG. 1, a tire 10 of the invention comprises at least a pair of annular beads 12 around which is wrapped at least one carcass ply 16. Belts 20, in the crown area of the tire, restrain the carcass ply and reinforce the crown area of the tire. Tread 22 is disposed over belts 20. Sidewalls 18 are disposed between the tread 22 and the beads 12. Sidewalls 18 comprise an upper sidewall 18a, which has a convex shape, and a lower sidewall 18b, which has a concave shape. The tire 10 is illustrated as being mounted on a rim 14.

Figure 2:
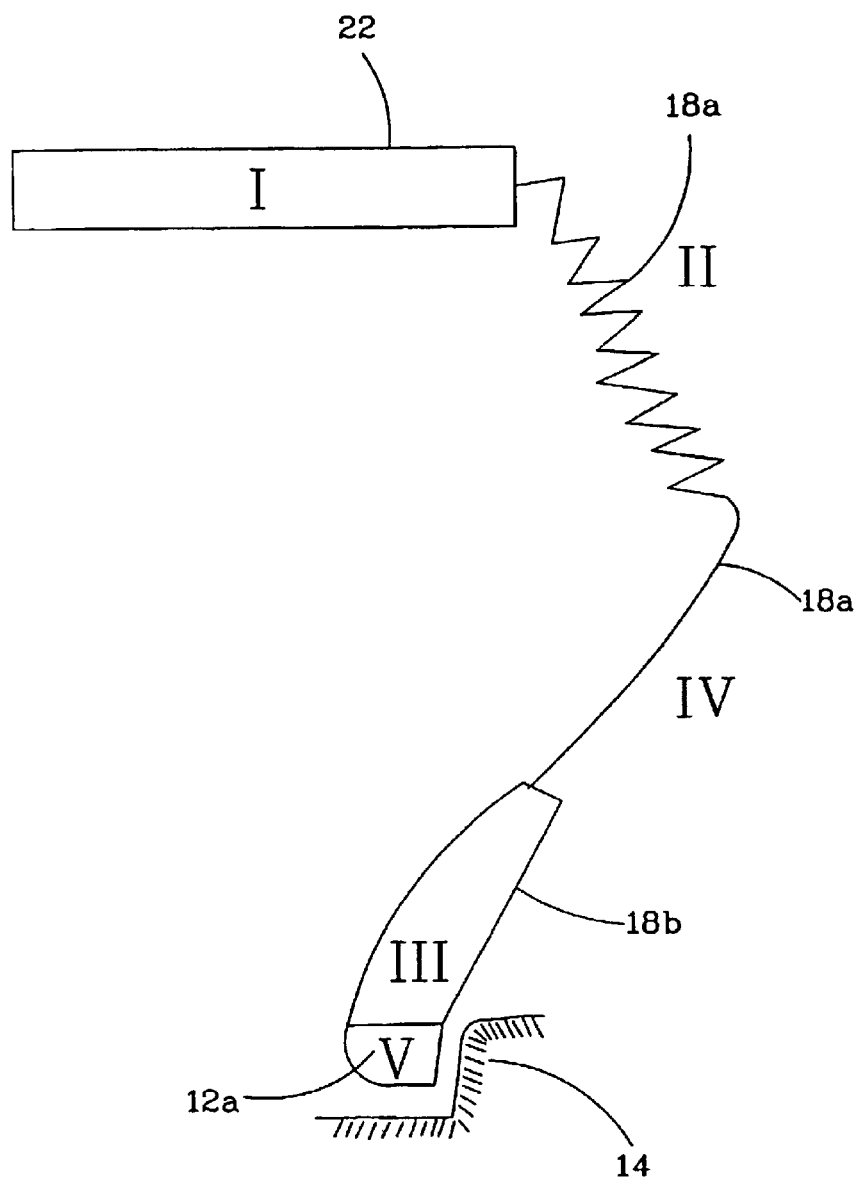
FIG. 2 illustrates schematically the structural components of a tire made using the method of the invention.

With reference now to FIG. 2, the tire of the invention is constructed such that lower sidewall 18b is highly reinforced, and is made with stiff compounds such that lower sidewall 18b is rigid and acts together with bead portion 12a to form a supporting substructure with a specified shape. Bead portion 12a and lower sidewall 18b act together when stresses act against lower sidewall 18b such that rim 14 acts as a pivot point for the movement of both bead portion 12a and lower sidewall portion 18b when the tire is subjected to stress.

Lower sidewall portion 18b has an apex 17 made of a stiff rubber having a modulus of 4760 Newtons per square centimeter (Npscm) to 6460 Npscm (7000 psi to 9500 psi) and a shape defined on one side by the ply line in the lower sidewall 18b, and on the opposite side by concave curve having a curvature equal to 0.5–0.8 times the curvature of the ply line in the lower sidewall 18b. In the illustrated embodiment, the apex 17 has a length which comprises 35% to 45% of the section height (SH) of the tire, and is covered by turnup portion 16a of carcass ply 16, which comprises at least 40%, but not more than 60% of the section height of the tire. Finally, chafer 19, which may be made of high modulus elastomer, and sidewall rubber 15, having a shape defined by a substantially flat exterior profile, sandwiches apex 17, carcass turnup 16a and the bead, to ensure that lower sidewall portion 18b acts, in the dynamics of the tire, as an isolated, single tire component.

Upper sidewall 18a is made flexible, so that it absorbs stresses encountered by tread 22, permitting treed 22 to remain substantially flat across the full tread width. Sidewall portion 18c is less flexible than sidewall portion 18a, and less rigid than sidewall portion 18b and provides a transition between the rigidity of sidewall portion 18b and the flexibility of sidewall portion 18a.

Tread 22 is made with an increased axial stiffness, and is further supported laterally by an extended wedge supporting the edges of belts 20, and a laterally stiffened belt reinforcement. The belt and tread accordingly act as a beam in the tire, which enhances the transfer of energy from the tread 22 to upper sidewall portion 18a of the tire.

With reference again to FIG. 1, belts 20 have an extended width comprising 82% to 92% of the section width (SW) of the tire, as compared to most conventional tires that have a belt width that comprises 70% to 80% of the SW of the tire, which helps improve the rigidity of tread 22. A wedge of rubber 21 is provided under the edges of belt 20 to help maintain the rigidity of tread 22. The wedge 21 is preferably made as an integrated, molded portion of sidewall 18. The wedge is an extended length wedge, that is the portion of wedge 21 that is contiguous with belts 20, has a length that corresponds to 37% to 43% of the belt width. Wedge 21 has a height that substantially removes all curvature from the belt at the belt edge.

Figure 3:
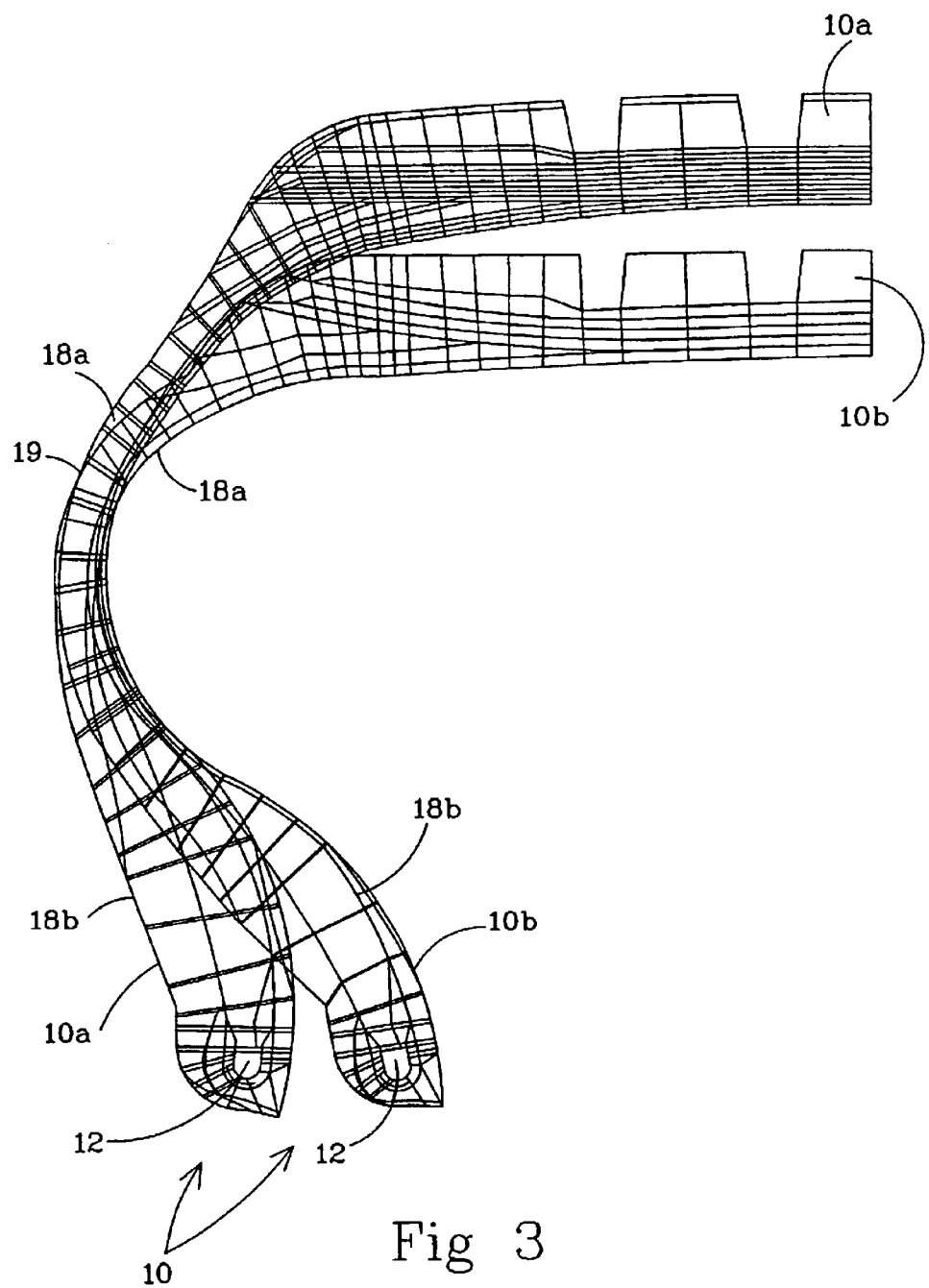
FIG. 3 illustrates superimposed views of the mold shape and the mounted shape of the tire of the invention.

When a tire is made, the tire components art laid up to produce a green tire, and the green tire is cured in a mold. The shape of a curing mold determines the cured shape of a tire. With reference now to FIG. 3, in the method of the invention, wherein it is an object to pre-stress a tire when it is mounted on its design rim, it is desired to produce a tire having a molded shape 10a wherein the distance between beads 12 on opposed sides of the tire is wider than the distance between beads 12 of the tire mounted shape 10b when the tire is mounted on design rim 14, i.e., the distance between the bead seats in the mold is greater than the distance between the bead seats on the rim. FIG. 3 illustrates superimposed views of the molded shape 10a of a tire, and its shape 10b when it is mounted on its rim and subjected to a normal load.

By pre-stress it is meant that stress is applied to parts of the tire simply by the act of mounting the tire on a rim. In the conception of the invention, the inventors theorized that pre-stressing would provide more strength and durability to the tire, in much the same way that concrete is able to withstand greater impact when pre-stressed. The pre-stresses act to counter some of the stresses resulting from subsequent tire loads due to inflation and footprint load.

When a tire 10 having a mold shape 10a is mounted on a rim 14, because of the rigidity of lower sidewall 18b, and the flexibility of upper sidewall 18a, the bead and lower sidewall 18b move in unison to accommodate the narrower rim width, and the sidewall pivots at a point 19 which is located in the area of upper sidewall 18a. See FIG. 3b.

It is believed that the establishment of pivot point 19 when the tire is mounted, further predisposes the tire sidewall to flex at this point, and helps provide a decoupling between the tread 22 and upper sidewall portion 18a.

The structure of tire 10 makes it possible for tread 22 to maintain flatter contact with a road surface than is possible in prior art tires. Flatter contact with the road means that the footprint of the tire will remain substantially constant while the tire rotates, and therefore will maintain a maximum possible net contact area at all times. Also, since the tread does not distort laterally as the tire rotates, the tread does not work as much (i.e. there is less slipping and crawling), and the traction properties, wear properties and rolling resistance properties should all be improved.

Figure 3A:
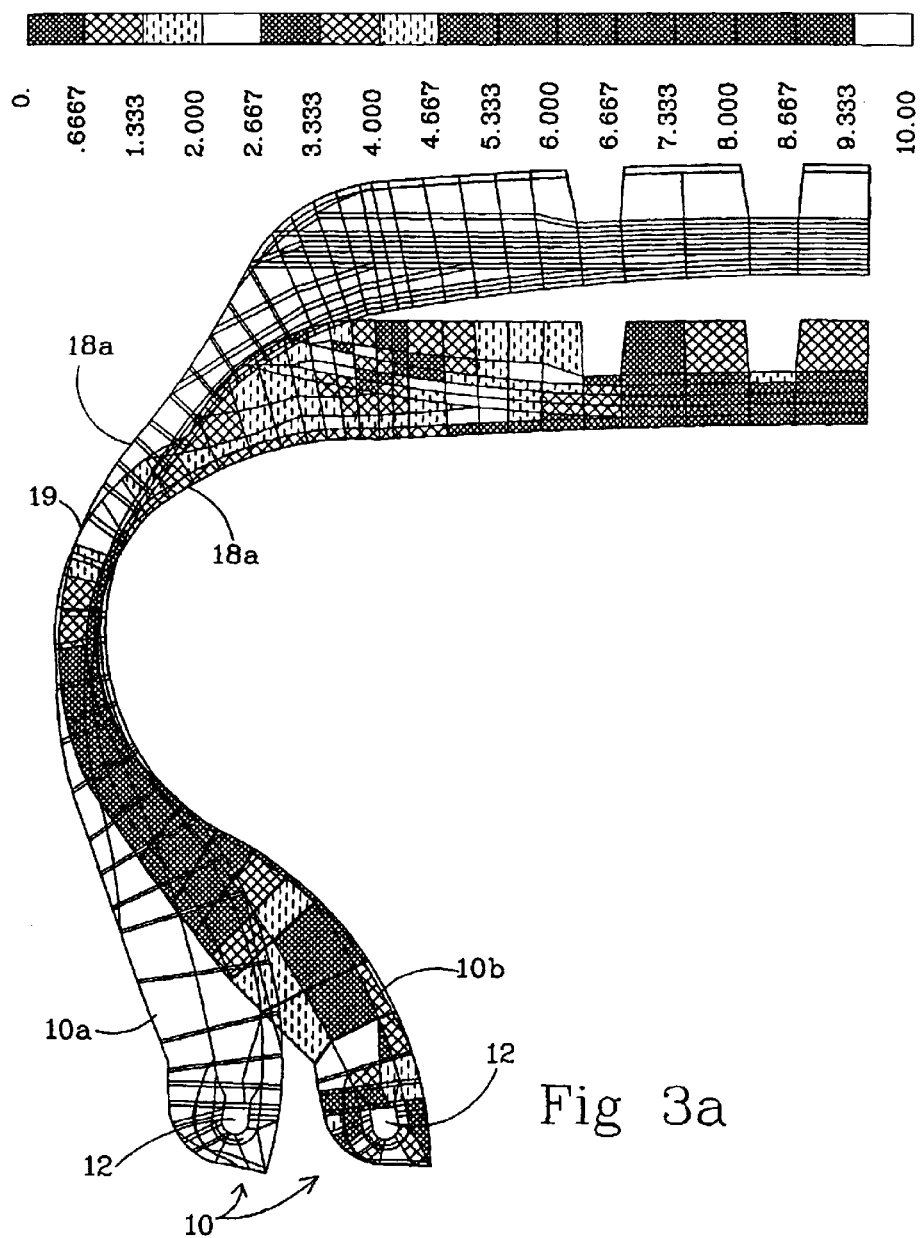
FIG. 3a illustrates stresses observed on a mounted tire, under load, superimposed with its original mold shape.

With reference now to FIG. 3a, stresses in the pre-loaded tire are illustrated. The shaded areas in the tire represent the areas of greatest stress. As can be seen in FIG. 3, the tire construction causes the stresses in the tire to be directed to the mid to lower sidewall, the concave portion of the lower sidewall, and the middle of the tread. In the tire of the invention, these areas of the tire carry most of the load for the tire, and are involved in causing the tire to respond when steering.

Figure 3B:
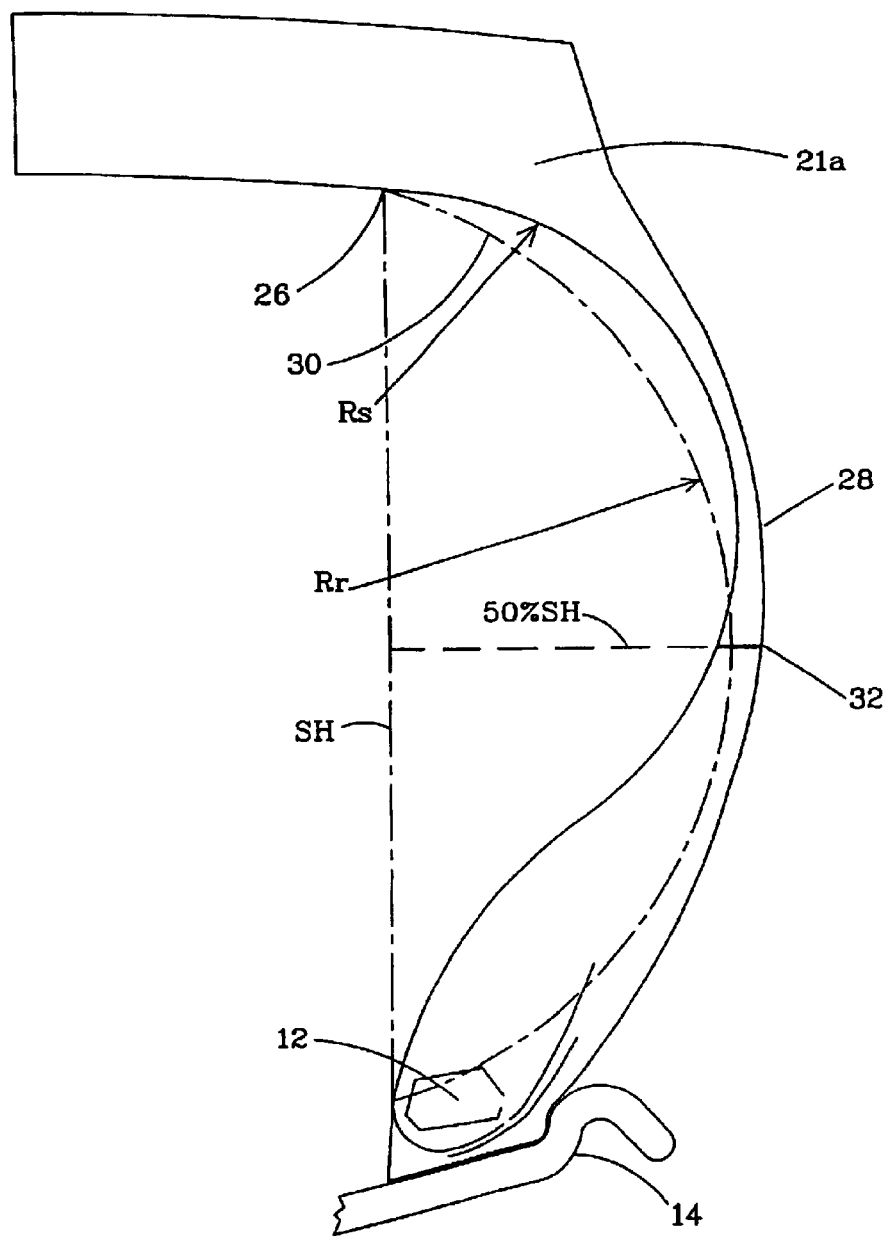
FIG. 3b illustrates the concept of the invention using relative dimensions within a truck tire construction.

With reference now to FIG. 3b, a tire of the invention is constructed having specific relationships between the shoulder point 26, a point 32 of the sidewall which corresponds to 50% of the section height of the tire, and the bead 12. This concept is illustrated using a truck tire construction, but is generally applicable to other kinds of tires. As is illustrated in FIG. 3b, a reference circle 30 can be drawn which contains shoulder point 26, 50% of the section height 32, and bead 12. In the illustrated embodiment, the $rho_m$ 28 of the tire, i.e., the widest point on the ply line of the tire, is designed to be greater than 50% of the section height 32. In the illustrated embodiment a $rho_m$ of 7.7 cm (3.03 inches) was selected, which corresponds to 60% of the section height. The radius $R_r$ of the reference circle 30 was chosen to be 6.22 cm (2.45 inches). The shoulder radius $R_s$ of the ply line was chosen to be smaller than $R_r$. When $R_s$ is smaller than $R_r$, this defines a convex profile which is believed to induce flexural deformation and reduce shear deformations. It is believed that $R_q$ that is 40% to 70% of $R_r$ will function in the invention, and in the illustrated embodiment, $R_s$ was chosen to be about 55% of $R^r$, which is 3.43 cm (1.35 inches).

By contrast, lower sidewall portion 18b is designed to have a concave profile, which is believed to better carry loads that are transferred from the footprint to the lower sidewalls. The rigidity of tread 22, the flexibility of upper sidewall portion 18a, the convex shape of upper sidewall portion 18a, and the position of $rho_m$ all work together to transfer these loads to lower sidewall portion 18b.

The concave shape also assures avoidance of stress reversal as a segment of the tire moves in and out of the footprint. Such stress reversal is detrimental to the durability of rubber and cord/rubber interfaces in a composite.

Figure 4:
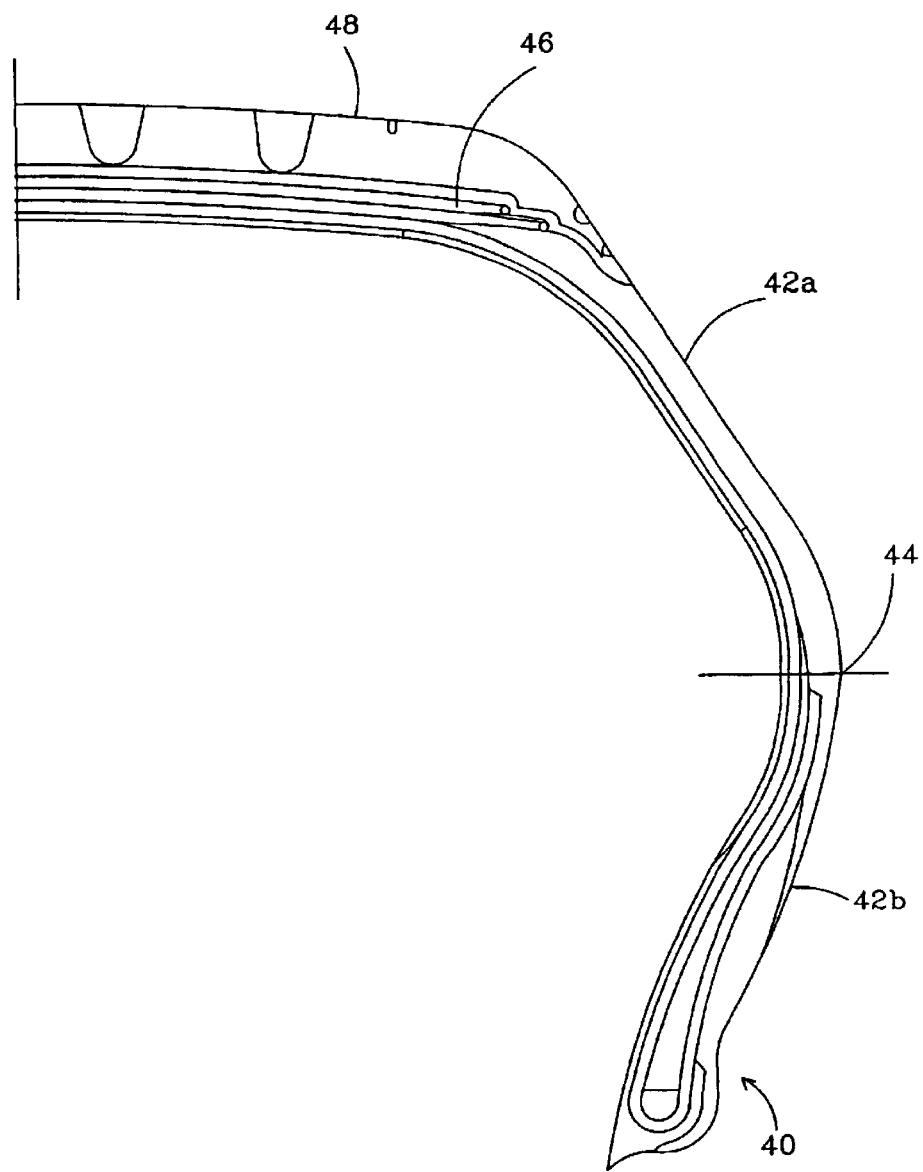
FIG. 4 illustrates the shape of a prior art tire.

With reference now to FIG. 4, the mold shape of a prior art tire 40 illustrated. Tire 40 is the control tire referred to in the examples. In the prior art tire, upper sidewall portion 42a and is lower sidewall portion 42b have a shape that can be defined as being substantially straight. The widest point 44 in the tire sidewall corresponds substantially with 50% of the section height of the tire. Belts 46 are somewhat curved in the shoulder area of the tire since the wedge is not long enough to ensure a complete flattening of the belt.

Figure 5:
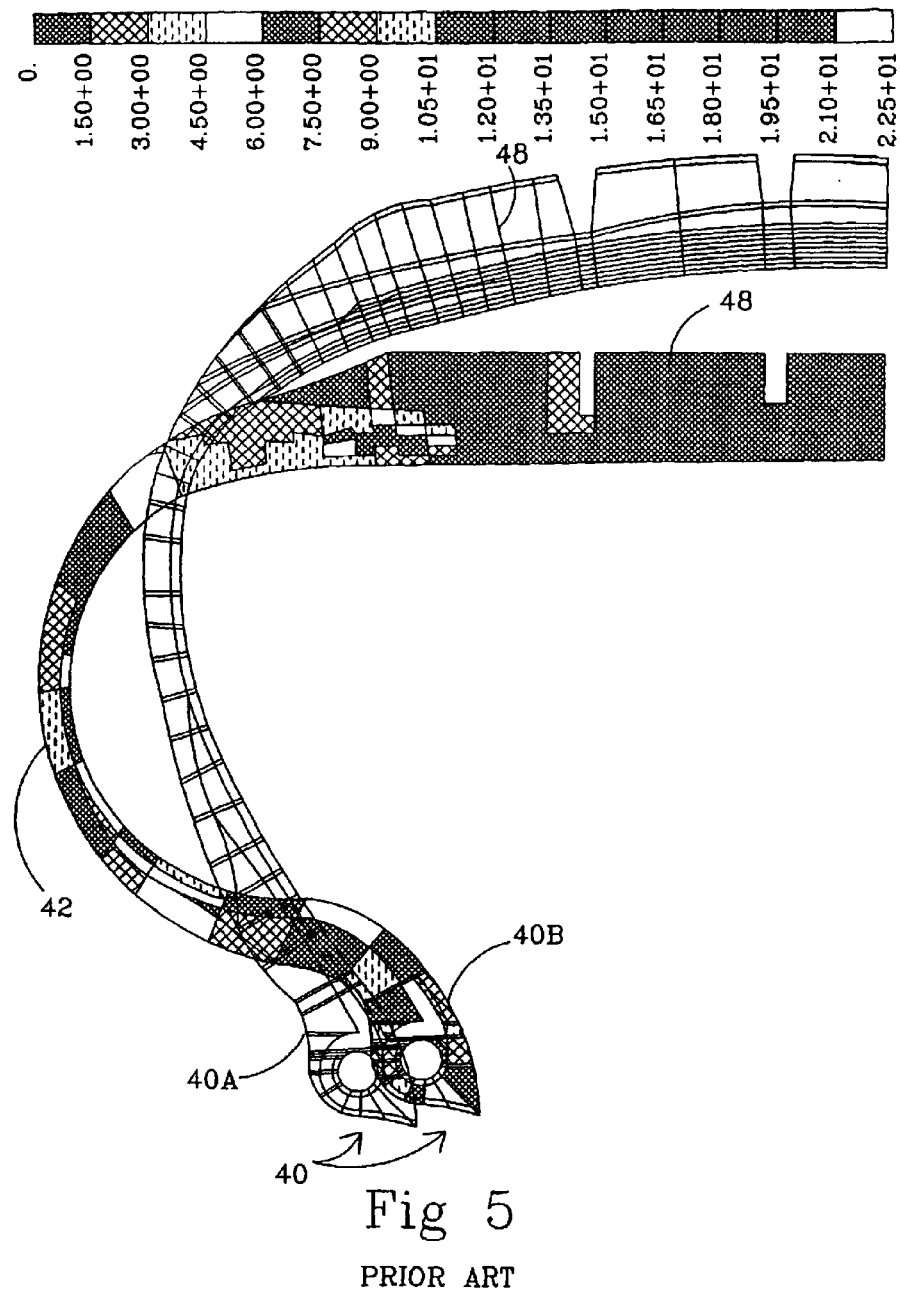
FIG. 5 illustrates superimposed views of the mold shape and the mounted shape of a prior art tire.

With reference now to FIG. 5, the mold shape 40a of tire 40 is substantially the same as the mounted shape 40b of the tire. Accordingly, sidewall 42 undergoes a substantially uniform distortion throughout its length when the tire is mounted on its design rim, the amount of distortion only being modified by the thickness of the rubber in the various portions of the sidewall. Accordingly, there is no pivot point in sidewall 42 which helps to distinguish or isolate the movement of the tread from the movement of the rest of the tire.

In the tire of the invention, the design of the lower sidewall substructures results in (a) an internally convex carcass profile with a high point of contraflexure, (b) an apex that is stiff, as defined by its elastic modulus of 4760 Npscm to 6460 Npscm (7000 psi to 9500 psi), and extends above the carcass's point of contraflexure, (c) a turnup ply that extends above the apex and touches the carcass ply, and a chipper compound defining an outer profile of the bead area of the tire, which together will provide the desired tire deformations first upon inflation and then upon footprint loading.

The invention is further illustrated with reference to the following examples.

EXAMPLE 1

In order to evaluate the new concept tire, finite element analyses (FEA) were conducted to compare the new tire to a selected, well-performing control tire. The strain energy densities (SED) in the tire were compared since the SED reflects the combined values of the three normal stresses, three shear stresses, and their strains. Tables 1 and 2 show the computed results for the control and the new concept tires.

A production tire, size P185/70 R14, was used as a control, for comparison with the properties of the same size experimental tire, made using the method of the invention. The stresses, strains, and rolling resistance contributions of various components of the tire were calculated.

The control tire and the experimental tire were set up with the same cord angles, the same green ends per centimeter (e.p.c.) (ends per inch (e.p.i.)), and the same materials. Table 1 also shows that the experimental tire showed less deflection than the control tire.

TABLE 1

Computed Tire Response for 2.04 kg/sqcm(29 psi) Inflation Pressure and 363.6 kg (800 lbs) Load:

|  | Control | Experimental |
|---|---|---|
| Belt (cured) Cord Angle | 21 | 21 |
| Belt (green) epc (epi) | 7.9 (20) | 7.9 (20) |
| Carcass (green) epc (epi) | 11 (28) | 11 (28) |
| Crown Deflection | 1.06 | 0.81 |
| Deflection as % of Section Height | 21% | 15% |

Table 2 shows the strain energy density of the two tires at the middle of the footprint, as calculated using FEA. From Table 2, and a comparison of FIG. 3a with FIG. 5, where the shaded areas represent the highest strain in the tire, it can be seen that the experimental are has lower strain energy density at the belt edges, the shoulders, the upper sidewall, the mid-sidewall, and lower sidewall than the control tire. Since strain energy can cause belt edge separations, this data shows that the tire of the invention should have more durability at the belt edge. Likewise, the lower strain energy in the lower sidewall shows that the tire of the invention will remain better seated on the rim than the control tire. Also, since there is lower strain energy in the lower sidewall, and less deflection, rolling resistance of the experimental tire should be improved because there is less energy loss associated with the flexing of the lower sidewall.

TABLE 2

Strain Energy Density in a Section at Middle of Footprint

|  | Control | Experimental |
|---|---|---|
| Belt Edges | 16.5 | 6.0 |
| Shoulders | 4.5 | 3.0 |
| Upper Sidewalls | 7.5 | 3.0 |
| Mid Sidewalls | 10.5 | 1.5 |
| Lower Sidewalls | 22.5 | 4.5 |

Using FEA, the specific contribution of key tire elements to the rolling resistance of the tire can be calculated. It is conventional in the tire industry to assess changes in each element's energy loss by changing the compound ingredients. A new method of analyzing energy loss in a tire is addressed in the present invention by comparing the role of different structural elements in a different tire, where the structural elements of interest are mainly the tread cap, the sidewall and the chafer. The redistribution of stain in the experimental tire can alter the rolling resistance of the tire, based on the relative contribution to rolling resistance of the key tire elements. The computed results are illustrated in Table 3.

TABLE 3

Rolling Resistance - % Contributions:

|  | Control | Experimental |
|---|---|---|
| Sidewall | 15.97 | 25.00 |
| Tread Cap | 45.05 | 14.31 |
| Chafer | 11.51 | 19.54 |
| Liner | 8.15 | 8.17 |
| Apex | 0.00 | 8.59 |
| Belts + Carcass Coats | 6.72 | 8.27 |
| Gum Strip | 1.64 | 8.36 |
| Tread Base | 4.35 | 4.00 |
| Toeguard | 4.67 | 2.43 |
| Mini Skirt | 1.75 | 1.23 |
| Bead Insulation | 0.19 | 0.09 |

EXAMPLE 2

Twelve control tires and twelve tires of the invention were built and tested for rolling resistance using the standard rolling resistance tests. The tires were constructed using the same materials, and differed only in that: the apex in the experimental tires was 6.35 cm (2 inches) high, and was absent in the control tire; the turn-up ply in the experimental tire extended 6.35 cm (2.5 inches) above the tire/rim interface, whereas the control tire had a turn-up of 1.78 cm (0.7 inch); a sidewall wedge in the experimental tire, in a portion below the first belt extended 5.79 cm (2.28 inches) as compared to a conventional wedge extending 1.22 cm (0.48 inch) in the control tire, and had a thickness below the edge of the first belt of 0.61 cm (0.24 inch) as compared to 0.13 cm (0.05 inch) in the control tire. The results are summarized in Table 4.

TABLE 4

|  | Control 185/70R14 | | Experimental 185/70R14 | |
|---|---|---|---|---|
| Tire Size | Weight Kg (lbs) | Rolling Resistance N (lbs) | Weight Kg (lbs) | Rolling Resistance N (lbs) |
|  | 7.76(17.07) | 35.9(8.16) | 8.23(18.10) | 30.7(6.97) |
|  | 7.75(17.06) | 33.7(7.67) | 8.19(18.02) | 30.8(7.00) |
|  | 7.75(17.04) | 35.9(8.17) | 8.23(18.10) | 30.8(6.99) |
|  | 7.73(17.01) | 34.2(7.78) | 8.21(18.06) | 31.1(7.07) |
|  | 7.70(16.95) | 31.4(7.85) | 8.23(18.10) | 30.8(7.01) |
|  | 7.68(16.90) | 34.6(7.86) | 8.23(18.11) | 31.2(7.10) |
|  | 7.71(16.97) | 34.8(7.91) | 8.70(18.15) | 31.4(7.14) |
|  | 7.70(16.95) | 34.2(7.77) | 8.29(18.24) | 31.7(7.20) |
|  | 7.68(16.90) | 34.0(7.73) | 8.25(18.14) | 31.5(7.17) |
|  | 7.64(16.80) | 34.1(7.76) | 8.15(17.94) | 30.7(6.98) |
|  | 7.72(16.98) | 34.6(7.87) | 8.22(18.09) | 30.2(6.86) |
|  | 7.64(16.80) | 33.7(7.67) | 8.21(18.06) | 29.4(6.69) |
| Average of 12 Tires | 7.70(16.95) | 34.5(7.85) | 8.22(18.09) | 30.9(7.02) |

The data shows that the experimental tires of the invention, although they have a weight increase of about 6.72%, have a vastly improved rolling resistance, about 10.64% better as compared to the control tires.

EXAMPLE 3

Eight tires of each construction illustrated in Example 2 were tested for durability using the standard Fatigue Capacity test (FatCap). The results, summarized in Table 8, indicate a 22% improvement in durability of the experimental tire.

TABLE 8

| Fatigue Capacity Test | Control 185/70R14 | Experimental 185/70R14 |
|---|---|---|
| T&RA Rated Load at 23.8 Npscm, 545.9 Kg (35 psi, 1201 lbs) | | |
| Fatigue Capacity | 1397.7 | 1701.6 |

While the invention has been specifically illustrated and described, those skilled in the art will recognize that the invention may be variously modified and practiced without departing from the spirit of the invention. The invention is limited only by the scope of the following claims.

What is claimed is:

1. A tire comprising a pair of substantially annular beads (12), at least one carcass ply (16) wrapped around said beads, tread (22) disposed over said carcass ply in a crown area of said tire, belt reinforcement (20) interposed between said tread and said carcass ply, and sidewalls (18) disposed between said tread (22) and said beads (12), each of said sidewalls in the tire having a lower sidewall region (18b), a mid-sidewall region (18c), and an upper sidewall region (18a), and a wedge (21) bridging each of said sidewalls and said tread (22), said tire (10) having said lower sidewall region (18b) which is integrally connected with a bead area (12a) of said tire and is stiffened with an apex (17), said lower sidewall (18b) being connected to said mid-sidewall (18c) having less stiffness than said lower sidewall, and said upper sidewall (18a) having a geometry and a low flexural stiffness such that it acts like a flexible coil connected to said mid-sidewall (18c) and providing a non-coupling bridge between the tread (22) at the crown of the tire and the mid-sidewall (18c), characterized in that said belt reinforcement (20) has a lateral stiffness equivalent to a belt reinforcement having two steel belts wherein each belt has 7.9 to 9.4 ends per centimeter (e.p.c.) steel cord reinforcement having a diameter of 0.042 cm at an angle of 21°, said apex having a length of 25% to 45% of the section height of the tire and a modulus of 4760 to 6160 Npscm, and said wedge (21) having a modulus of 396 to 594 Npscm bridging said sidewall and tread with a portion contiguous with said belts (20) comprising 37% to 43% of the tread width.

2. The tire of claim 1 wherein said tread (22) is flat with respect to a surface on which said tire (10) is in contact.

3. The tire of claim 1 wherein belts or breakers (20) interposed between said carcass (16) and said tread (22) in a crown area of said tire (10) are characterized in that said belts (20) are anchored in a shoulder region of said tire, thereby providing hinged support for said tread and a decoupling of the tread (22) from the upper sidewall (18a), said shoulder being defined as the intersection of the ply line radius and the tread radius.

4. The tire of claim 1 wherein the shoulder (26), 50% of the section height (32) and the bead (12) define points on a circle (30), and the shoulder radius $R_s$ of said tire is smaller than the radius Rr of circle (30).

5. The tire of claim 1 wherein in the shoulder (26), 50% of the section height (32) and the bead (12) define points on a reference circle (30), and the shoulder radius $R_s$ of said tire is 50% to 60% of the radius Rr reference of circle (30).

6. The tire of claim 1 wherein said lower sidewalls (18b) have a concave profile.

7. The tire of claim 1 wherein the molded base width is 20 to 25% wider than the specification rim width for said tire.

8. The tire of claim 1 wherein turn-up ply endings extend at least to 35% of the section height of the tire.

9. The tire of claim 1 wherein the apex (17) extends at least 20% of the section height of the tire.

10. A method for constructing a pneumatic tire according to claim 1 comprising the steps of (a) building a tread (22) independently of the rest of the tire (10) wherein the tread is made to be linear across its width, (b) wrapping at least one carcass ply (16) around at least a pair of parallel annular beads (12) wherein a turnup (16a) of at least one carcass ply (16) extends at least 40% but not more than 65% of the section height of the tire, (c) preparing belt reinforcement (20) having substantial lateral stiffness for said tire to have a lateral stiffness equivalent to a belt reinforcement having two steel belts wherein each belt has 7.9 to 9.4 ends per centimeter (e.p.c.) (20 to 24 ends per inch (e.p.i.) steel cord reinforcement having a diameter of 0.042 cm at an angle of 21°

(d) applying said belt reinforcement (20) to a crown area of said carcass ply (16)

(e) disposing a wedge (21) between the edges of said belt reinforcement (20) and the curvature of the carcass (16) in a shoulder area (26) of the tire, wherein the wedge (21) has a height sufficient to maintain the lateral linearity of the tread (f) preparing an apex (17) for said tire having a length of 25% to 45% of the section height of the tire and a modulus of 4760 to 6160 Npscm (7000 to 9500 psi), and applying said apex (17) next to the bead (12) while constructing said tire (10)

(g) preparing said wedge (21) as an integral part of sidewall 18, wherein a portion of wedge 21 contiguous with belts (20) has a length of 37% to 43% of the tread width, and preparing wedge (21) to have a modulus of 396 to 594 Npscm (600 to 900 psi).

11. The method of claim 10 comprising the further step curing a green tire having a mold shape wherein the distance between the beads (12) in a curing mold is 110% to 175% times the distance between the bead seats on the specified rim (14) for said tire.

* * * * *